United States Patent
Tumuluru et al.

(10) Patent No.: US 11,012,507 B2
(45) Date of Patent: May 18, 2021

(54) HIGH THROUGHPUT LAYER 2 EXTENSION LEVERAGING CPU FLOW AFFINITY

(71) Applicant: VMware, Inc., Palo Alto, CA (US)

(72) Inventors: Laxminarayana Tumuluru, Palo Alto, CA (US); Todd Sabin, Morganville, NJ (US); Weiqing Wu, Cupertino, CA (US); Serge Maskalik, Los Gatos, CA (US); Sachin Thakkar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 559 days.

(21) Appl. No.: 15/690,222

(22) Filed: Aug. 29, 2017

(65) Prior Publication Data

US 2018/0069924 A1 Mar. 8, 2018

Related U.S. Application Data

(60) Provisional application No. 62/380,993, filed on Aug. 29, 2016.

(51) Int. Cl.
*H04L 29/08* (2006.01)
*H04L 29/12* (2006.01)
(Continued)

(52) U.S. Cl.
CPC ............ *H04L 67/1097* (2013.01); *G06F 8/65* (2013.01); *G06F 9/5027* (2013.01);
(Continued)

(58) Field of Classification Search
CPC ... H04L 67/1097; H04L 45/302; H04L 45/04; H04L 61/2061; H04L 45/72; H04L 69/324; H04L 69/22; H04L 69/16; H04L 43/103; H04L 41/082; H04L 63/029; H04L 67/10; H04L 12/4633; H04L 49/70; H04L 49/354; H04L 41/0803; H04L 47/825; H04L 47/12; H04L 63/0272; H04L 61/2007;
(Continued)

(56) References Cited

U.S. PATENT DOCUMENTS

| | | | | |
|---|---|---|---|---|
| 6,708,218 B1 * | 3/2004 | Ellington, Jr. | ........... | H04L 29/06 709/230 |
| 7,392,399 B2 * | 6/2008 | Grohoski | .............. | G06F 9/3879 712/E9.067 |

(Continued)

OTHER PUBLICATIONS

Herbert, Tom. "UDP encapsulation in linux." The Technical Conference on Linux Networking. 2015.*

*Primary Examiner* — Jimmy H Tran
(74) *Attorney, Agent, or Firm* — Patterson + Sheridan, LLP

(57) ABSTRACT

Techniques leveraging CPU flow affinity to increase throughput of a layer 2 (L2) extension network are disclosed. In one embodiment, an L2 concentrator appliance, which bridges a local area network (LAN) and a wide area network (WAN) in a stretched network, is configured such that multiple Internet Protocol Security (IPsec) tunnels are pinned to respective CPUs or cores, which each process traffic flows for one of the IPsec tunnels. Such parallelism can increase the throughput of the stretched network. Further, an L2 concentrator appliance that receives FOU packets is configured to distribute the received FOU packets across receive queues based a deeper inspection of inner headers of such packets.

20 Claims, 6 Drawing Sheets

(51) Int. Cl.
| | |
|---|---|
| *H04L 29/06* | (2006.01) |
| *G06F 8/65* | (2018.01) |
| *H04L 12/24* | (2006.01) |
| *G06F 9/50* | (2006.01) |
| *H04L 12/801* | (2013.01) |
| *H04L 12/911* | (2013.01) |
| *H04W 28/02* | (2009.01) |
| *H04L 12/931* | (2013.01) |
| *H04L 12/46* | (2006.01) |
| *H04L 12/26* | (2006.01) |
| *H04L 12/721* | (2013.01) |
| *H04L 12/715* | (2013.01) |
| *H04L 12/725* | (2013.01) |
| *G06F 9/455* | (2018.01) |

(52) U.S. Cl.
CPC .......... *G06F 9/5044* (2013.01); *G06F 9/5061* (2013.01); *G06F 9/5077* (2013.01); *H04L 12/4633* (2013.01); *H04L 41/082* (2013.01); *H04L 41/0803* (2013.01); *H04L 43/103* (2013.01); *H04L 45/72* (2013.01); *H04L 47/12* (2013.01); *H04L 47/825* (2013.01); *H04L 49/354* (2013.01); *H04L 49/70* (2013.01); *H04L 61/2007* (2013.01); *H04L 61/2592* (2013.01); *H04L 63/029* (2013.01); *H04L 63/0272* (2013.01); *H04L 67/10* (2013.01); *H04L 69/16* (2013.01); *H04L 69/22* (2013.01); *H04L 69/324* (2013.01); *H04W 28/0273* (2013.01); *H04W 28/0289* (2013.01); *G06F 2009/4557* (2013.01); *H04L 45/04* (2013.01); *H04L 45/302* (2013.01); *H04L 47/10* (2013.01); *H04L 61/2061* (2013.01); *H04L 61/6022* (2013.01); *H04W 28/02* (2013.01); *H04W 28/0284* (2013.01)

(58) Field of Classification Search
CPC . H04L 61/2592; H04L 61/6022; H04L 47/10; G06F 9/5077; G06F 9/5044; G06F 8/65; G06F 9/5061; G06F 9/5027; G06F 2009/4557; H04W 28/0284; H04W 28/02; H04W 28/0289; H04W 28/0273
See application file for complete search history.

(56) References Cited

U.S. PATENT DOCUMENTS

| | | | |
|---|---|---|---|
| 8,958,293 B1* | 2/2015 | Anderson | H04L 67/1002 370/230 |
| 9,385,912 B1* | 7/2016 | Vincent | H04L 69/22 |
| 9,571,394 B1* | 2/2017 | Sivaramakrishnan | H04L 45/7453 |
| 10,034,201 B2* | 7/2018 | Pallas | H04W 28/08 |
| 10,565,001 B2* | 2/2020 | Nakil | G06F 11/07 |
| 2003/0088421 A1 | 5/2003 | Maes et al. | |
| 2003/0191834 A1 | 10/2003 | Steegmans | |
| 2004/0081091 A1 | 4/2004 | Widmer et al. | |
| 2004/0225885 A1* | 11/2004 | Grohoski | H04L 63/164 713/189 |
| 2005/0063381 A1* | 3/2005 | Kayalackakom | H04L 63/166 370/389 |
| 2007/0109966 A1 | 5/2007 | Lee et al. | |
| 2007/0280243 A1 | 12/2007 | Wray et al. | |
| 2008/0031149 A1 | 2/2008 | Hughes et al. | |
| 2008/0138067 A1 | 6/2008 | Beshai | |
| 2009/0113203 A1 | 4/2009 | Tsuge et al. | |
| 2010/0169636 A1* | 7/2010 | Davis | H04L 63/04 713/2 |
| 2011/0022812 A1* | 1/2011 | van der Linden | G06F 9/5077 711/163 |
| 2011/0044438 A1 | 2/2011 | Wang et al. | |
| 2012/0087313 A1 | 4/2012 | Yin et al. | |
| 2012/0163388 A1* | 6/2012 | Goel | H04L 12/4641 370/395.53 |
| 2012/0281706 A1* | 11/2012 | Agarwal | H04L 67/1002 370/395.53 |
| 2012/0281708 A1* | 11/2012 | Chauhan | H04L 63/0272 370/401 |
| 2013/0016612 A1 | 1/2013 | Vasseur et al. | |
| 2013/0031233 A1* | 1/2013 | Feng | G06F 9/06 709/223 |
| 2013/0044764 A1 | 2/2013 | Casado et al. | |
| 2013/0070654 A1 | 3/2013 | Nishimura | |
| 2013/0083701 A1 | 4/2013 | Tomic et al. | |
| 2013/0128786 A1 | 5/2013 | Sultan et al. | |
| 2013/0263125 A1 | 10/2013 | Shamsee et al. | |
| 2013/0305311 A1 | 11/2013 | Puttaswamy Naga et al. | |
| 2014/0105015 A1 | 4/2014 | Hui et al. | |
| 2014/0108665 A1* | 4/2014 | Arora | H04L 67/141 709/227 |
| 2014/0108722 A1 | 4/2014 | Lipchuk et al. | |
| 2014/0133302 A1 | 5/2014 | Fu et al. | |
| 2014/0229945 A1* | 8/2014 | Barkai | H04L 49/70 718/1 |
| 2014/0241247 A1* | 8/2014 | Kempf | H04L 12/4633 370/328 |
| 2014/0320500 A1 | 10/2014 | Fletcher et al. | |
| 2015/0249565 A1 | 9/2015 | Yamabe et al. | |
| 2015/0281078 A1 | 10/2015 | Luo et al. | |
| 2016/0057109 A1* | 2/2016 | DeCusatis | H04L 63/0209 726/12 |
| 2016/0094364 A1 | 3/2016 | Subramaniyam et al. | |
| 2016/0182379 A1* | 6/2016 | Mehra | H04L 47/125 709/223 |
| 2016/0182380 A1* | 6/2016 | Mehra | H04L 47/125 |
| 2016/0197836 A1* | 7/2016 | Hussain | H04L 69/22 713/160 |
| 2016/0349993 A1 | 12/2016 | Udupi et al. | |
| 2017/0078197 A1* | 3/2017 | Cj | H04L 12/4633 |
| 2017/0085502 A1* | 3/2017 | Biruduraju | H04L 12/4633 |
| 2017/0093754 A1 | 3/2017 | Zhang et al. | |
| 2017/0099160 A1* | 4/2017 | Mithyantha | H04L 67/10 |
| 2017/0099188 A1* | 4/2017 | Chang | H04L 63/20 |
| 2017/0257309 A1 | 9/2017 | Appanna | |
| 2017/0310756 A1* | 10/2017 | Pandya | H04L 67/34 |
| 2018/0006935 A1 | 1/2018 | Mutnuru et al. | |
| 2018/0062875 A1 | 3/2018 | Tumuluru | |
| 2018/0062920 A1 | 3/2018 | Srinivasan et al. | |
| 2018/0063074 A1 | 3/2018 | Shankarappa et al. | |
| 2018/0063077 A1 | 3/2018 | Tumuluru | |
| 2018/0063193 A1* | 3/2018 | Chandrashekhar | G06F 9/45558 |
| 2018/0063743 A1 | 3/2018 | Tumuluru et al. | |
| 2019/0349341 A1* | 11/2019 | Singleton, IV | H04L 63/083 |
| 2020/0106706 A1* | 4/2020 | Mayya | H04L 43/028 |
| 2020/0192695 A1* | 6/2020 | Vincent | H04L 41/082 |
| 2020/0336484 A1* | 10/2020 | Mahajan | H04L 67/125 |

* cited by examiner

HIGH THROUGHPUT LAYER 2 EXTENSION LEVERAGING CPU FLOW AFFINITY

CROSS-REFERENCE TO RELATED APPLICATIONS

This application claims the benefit of U.S. Provisional Patent Application No. 62/380,993, filed Aug. 29, 2016, the entire contents of which are incorporated by reference herein.

This application is related to the patent applications entitled "Creating Layer 2 Extension Networks in a Hybrid Cloud Computing System" Ser. No. 15/690,225 and "Low Downtime Software-Defined Wide Area Network Service Upgrade" Ser. No. 15/690,230, which are assigned to the assignee of this application and filed on the same day as this application and which are herein incorporated by reference in their entireties.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as VMs, to be rapidly moved from the data center to the cloud, among other things.

SUMMARY

One embodiment disclosed herein provides a computer-implemented method of processing packets for transmission. The method generally includes receiving a packet. The method further includes determining a hash value based on at least one or more fields in the packet. In addition, the method includes placing the packet in one of a plurality of receive queues based on at least the hash value, wherein packets placed in each receive queue of the plurality of receive queues are processed by a respective CPU or core associated with the receive queue.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Embodiments disclosed herein leverage CPU flow affinity to increase throughput of a layer 2 (L2) extension network. Doing so may help meet enterprise requirements for application accessibility and throughput in a stretched network. For example, a VM on the cloud side of a stretched network may need to remotely mount a network file system (NFS) file, creating heavy traffic that the stretched network cannot otherwise handle as a result of the overhead created by stretching the network and encrypting communications over the stretched network. In one embodiment, an L2 concentrator appliance, which bridges a local area network (LAN) and a wide area network (WAN) in a stretched network, is configured such that multiple Internet Protocol Security (IPsec) tunnels are pinned to respective CPUs or cores, which each process traffic flows for one of the IPsec tunnels. Such parallelism can increase the throughput of a stretched network. Further, an L2 concentrator appliance that receives FOU packets is configured to distribute the received FOU packets across receive queues based a deeper inspection of inner headers of such packets.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

System Overview

Figure 1:
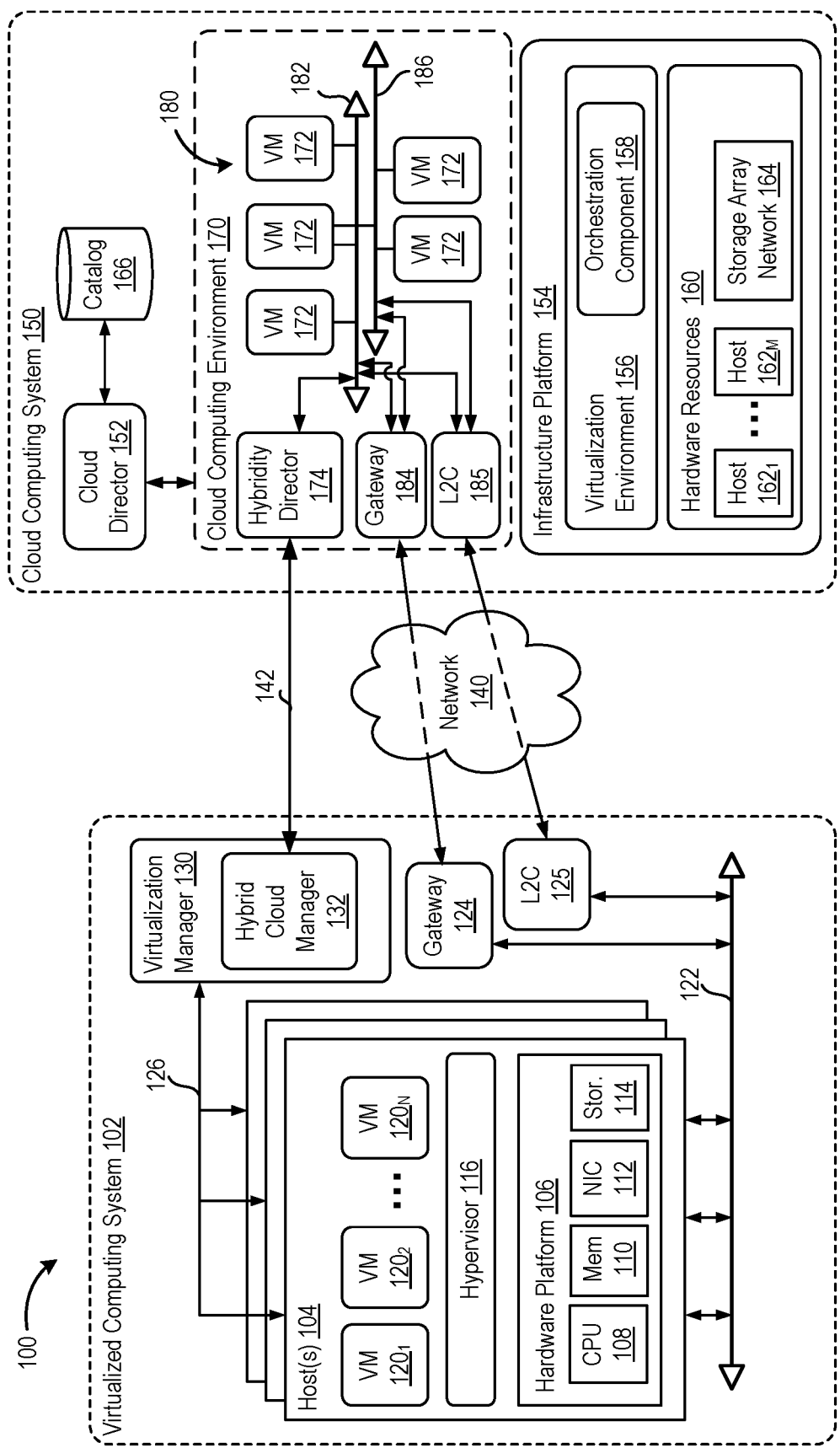
FIG. 1 is a block diagram of a hybrid cloud computing system in which one or more embodiments of the present disclosure may be utilized.

FIG. 1 is a block of a hybrid cloud computing system 100 in which one or more embodiments of the present disclosure may be utilized. Hybrid cloud diagram computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service providing cloud services to various organizations within the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 112S within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system (OS) of host 104 or directly on hardware components of host 104. In addition, hypervisor 116 may provide a virtual switch (not shown), which is a software-based switch acting as a layer 2 (L2) forwarding engine and may be capable of performing virtual local area network (VLAN) tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link between virtualized computing system 102 and cloud computing system 150. Illustratively, layer 2 concentrators (L2C) 125 and 185 are parallel to gateways 124 and 184 and configured to provide a "stretched" L2 network that spans virtualized computing system 102 and cloud computing system 150, as described in greater detail below. In one embodiment, stretched network 145 may be separate from network 140 used by gateways 124 and 184 so that, e.g., VM migration traffic over network 140 does not create latency in stretched network 145.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director (e.g., executing as a virtual machine) may communicate with hybrid cloud manager 132 using Internet-based traffic via a VPN tunnel established between gateways 124 and 184, or alternatively, using direct connect 142.

Layer 2 Extension Networks

One embodiment permits L2 extension networks to be created by deploying, configuring, and connecting virtual appliances in a data center and in a cloud so that the appliances communicate via secure IPsec tunnels and bridge networks that are in the data center and in the cloud. As described, an L2 extension network, or "stretched network," is a network spanning both a data center and the cloud in a hybrid cloud computing system, and stretched networks may permit, among other things, seamless workload migration by allowing endpoint network configurations and network in the data center to be kept when workloads are migrated to the cloud.

Figure 2:
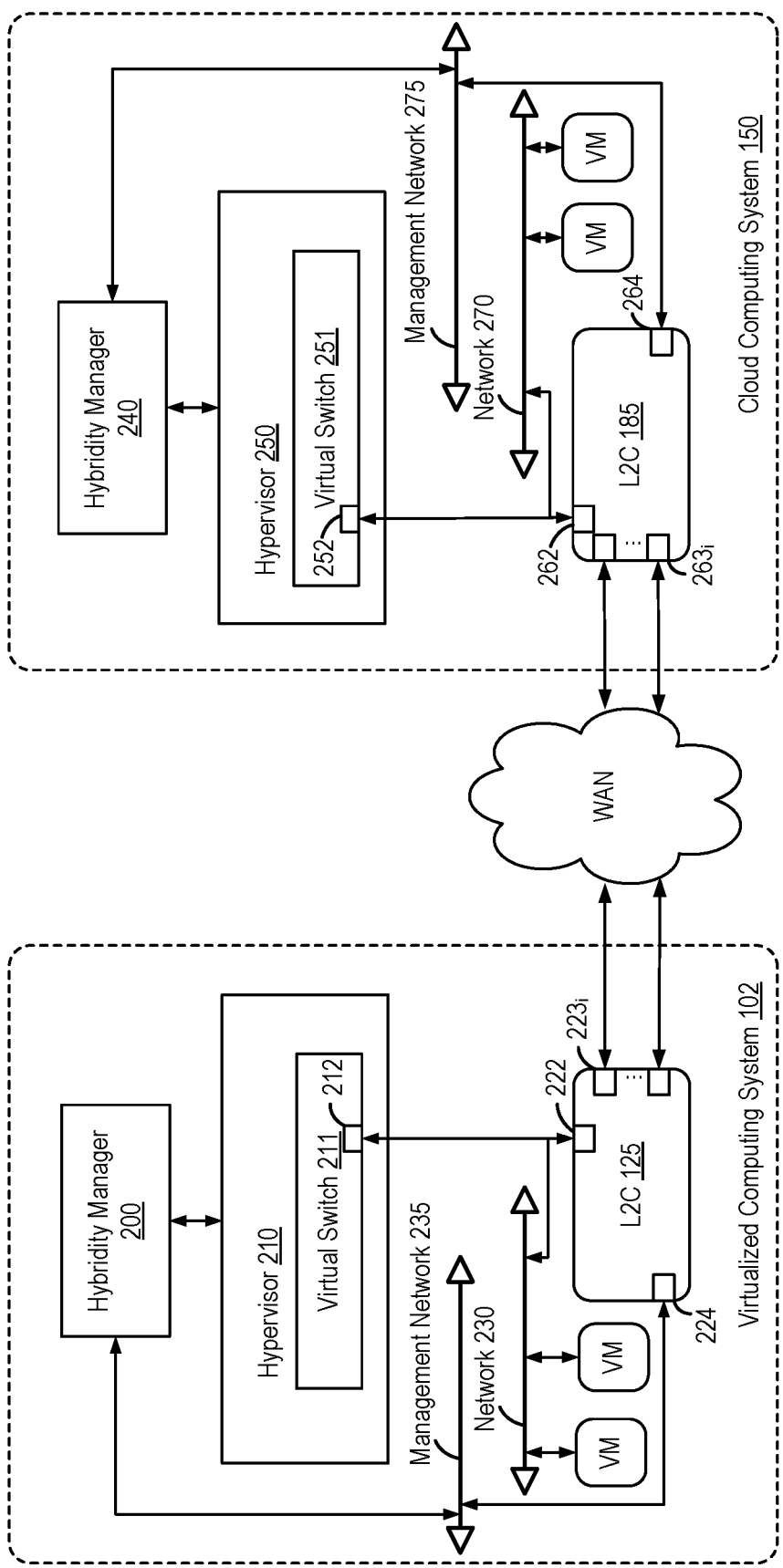
FIG. 2 illustrates components of hybrid cloud computing system used to create a stretched network, according to an embodiment.

FIG. 2 illustrates components of hybrid cloud computing system 100 used to create a stretched network, according to an embodiment. As shown, L2 concentrators 125 and 185 are virtual appliances deployed in virtualized computing system 102 and cloud computing system 150, respectively. As used herein, a "virtual appliance" refers to a VM image with a pre-configured software application, such as an application that performs the functions of an L2 concentrator. L2 concentrator appliances 125 and 185 are owned by hybridity manager 200 (which may correspond to, e.g., hybrid cloud manager 132) and hybridity manager 240

(which may correspond to, e.g., hybridity director 174), respectively. Hybridity managers 200 and 240 are registered with each other and tethered together, and have the ability to perform tasks requested by the other so that hybrid tasks can be executed together During the execution of hybrid tasks, jobs may be passed via a message bus between hybridity manager 200 and hybridity manager 240, with each job including a set of tasks to be performed to accomplish a focused goal or set of goals, as described in U.S. patent application Ser. No. 14/839,180 entitled Hybrid Task Framework and filed on Aug. 28, 2015, which is incorporated by reference herein in its entirety. Hybridity managers 200 and 240 may execute different tasks responsive to such jobs passed between them. For example, jobs may be used to share digital certificates, trigger local and remote virtual appliance deployments, persist deployment configurations, and the like.

As described in greater detail below, in order to create a stretched network, a pair of virtual appliances, such as L2 concentrator appliances 125 and 185, are first deployed in virtualized computing system 105 and in cloud computing system 150, respectively. IPsec tunnels with GRE tunnels therein (i.e., GRE over IPsec) are created between the pair of virtual appliances for passing traffic securely between them, thereby providing a secure data plane on which a network may be stretched and VMs migrated. It should be understood that the GRE encapsulation hides the L2 frame, and the IPsec encapsulation is for security. Although IPsec is used herein as an example of a protocol suite for securing IP communications IPsec by authenticating and encrypting IP packets and GRE is used herein as an example of a tunneling protocol that is able to encapsulate network layer protocols inside virtual point-to-point links over an IP network, it should be understood that other types of tunneling protocols/encapsulation and encrypted link(s) may be used IPsec in alternative embodiments. After the pair of virtual appliances are deployed and the IPsec tunnels established, a stretched network is created by (1) connecting a virtual interface card (VNIC) in each of the virtual appliances to a respective network that is local to virtual computing system 105 or cloud computing system 150, (2) configuring the virtual switch ports to which the virtual appliances are connected as sink ports that traffic from the VMs on the respective local network and having non-local destinations are redirected to, and (3) configuring each of the virtual appliances to bridge their VNIC connected to a local network and the GRE tunnels, i.e., to bridge local area network (LAN) and wide area network (WAN) links.

As shown, L2 concentrators 125 and 185 include VNICs 222-224 and 262-264, respectively. VNICs 222-224 and 262-264 are software-based virtual network adapters that may be logically connected to one or more physical network adapters (PNICs) via virtual switches 211 and 251 provided by hypervisors 210 and 250, respectively. In one embodiment, virtual switches 211 and 251 may be distributed virtual switches or components thereof, where a distributed virtual switch is a type of virtual switch that extends ports and management across host computers. In one embodiment, L2 concentrators 125 and 185 each include one VNIC that is a management interface, which is shown as VNICs 224 and 264 that are connected to management networks 235 and 275 and in communication with hybridity managers 200 or 240, respectively. L2 concentrators 125 and 185 further include one or multiple (e.g., 8) VNICs that are uplink interfaces that provide traffic paths to PNICs and that IPsec tunnel traffic passes through, which are shown as VNICs $223_i$ and $263_i$, respectively. In addition, L2 concentrators 125 and 185 each include one VNIC, shown as VNICs 222 and 262, which is a bridge interface that is connected to a network 230 and 270 that is local to virtualized computing system 102 and cloud computing system 150, respectively. Although one bridging interface is shown in each of L2 concentrators 125 and 185, meaning that one stretched network can be created using L2 concentrators 125 and 185, it should be understood that any number of bridging interfaces may be employed in other embodiments.

To create a stretched network, hybridity manager 200 configures L2 concentrator 125 to enable bridging, with one leg of the bridge being VNIC 222 that is connected to the local network 230 and another leg of the bridge being the GRE tunnel(s) going through IPsec tunnel(s) and VNICs $223_i$. Hybridity manager 200 further configures L2 concentrator 125 with details of the local (self) and remote L2 concentrator 185 peer IP addresses, which may be derived from, e.g., an internal IP address pool. For example, if the internal IP address pool is the 192.0.02 series of IP addresses, the following pairs of IP addresses may be used: 192.0.02.3/192.0.2.19, 192.0.2.4/192.0.2.20, etc. Hybridity manager 185 in cloud computing center 150 may configure L2 concentrator 185 to enable bridging and with details of local and remote peer IP addresses in a similar manner. Bridging is then configured and enabled.

In one embodiment, which is discussed in greater detail below, hybridity manager 200 first reserves bridge VNIC 222 and then connects VNIC 222 to network 230, such as by connecting VNIC 222 to a particular port group, where VMs connected to that port group belong to network 230 (e.g., a VLAN). Further, hybridity manager 200 configures the port 212 to which VNIC 222 is connected as a sink port to which virtual switch 211 is configured to redirect packets with non-local destinations. It should be understood that virtual switch 211 will typically not send flooded traffic which is not meant for the media access control (MAC) address of VNIC 222 to VNIC 222, but this optimization can be eliminated by enabling the port to which VNIC 222 is connected as a sink port so that the port is treated as an uplink port that receives flooded traffic. As a result, sink port 212 to which L2 concentrator 125 is connected will receive all packets with non-local destinations (which are redirect to sink port 212 by the virtual switch). L2 concentrator 125 is further configured to bridge VNIC 222 and GRE tunnels going through VNICs $223_i$ such that L2 concentrator forwards packets with non-local destinations received via VNIC 222 to L2 concentrator 185 via VNICs $223_i$, over the GRE and IPsec tunnels between L2 concentrators 125 and 185, L2 concentrator 185 is connected to network 270 and may inject the traffic it receives from L2 concentrator 125 on to network 270 so that the traffic is ultimately routed to a destination in cloud computing system 150. This process essentially gives the illusion that there is nothing between network 230 in virtualized computing system 102 and network 270 in cloud computing system 150, i.e., that networks 230 and 270 together form a stretched network spanning virtualized computing system 102 and cloud computing system 150. After VNIC 222 is connected to the network being stretched and sink port settings and bridging are configured, hybridity manager 200 then enables the VNIC 222 inside a guest OS. In one embodiment, the connection and sink port configurations may be persisted so that L2 concentrator 125 can later be redeployed (e.g., if L2 concentrator 125 fails) and reconfigured to connect VNIC 222 and configure it as a sink port.

Hybridity manager 240 on cloud computing system 150 side may perform similar actions as those performed by hybridity manager 200, including reserving a VNIC 262 corresponding to VNIC 222 reserved in virtualized computing system 102, where the same VNIC index may be used on both sides for a given bridge; connecting VNIC 262 to a network (e.g., a virtual wire) backing a cloud network 270; configuring the port 252 to which VNIC 262 is connected as a sink port to which traffic with non-local destination is redirected so that L2 concentrator 185 may securely send such traffic to L2 concentrator 125 over the IPsec tunnel between these appliances; persisting the connection and sink port configurations; and enabling VNIC 262 in a guest OS. Further, the stretched network may be unstretched by reversing the operations discussed above in both virtualized computing system 102 and cloud computing system 150.

Figure 3:
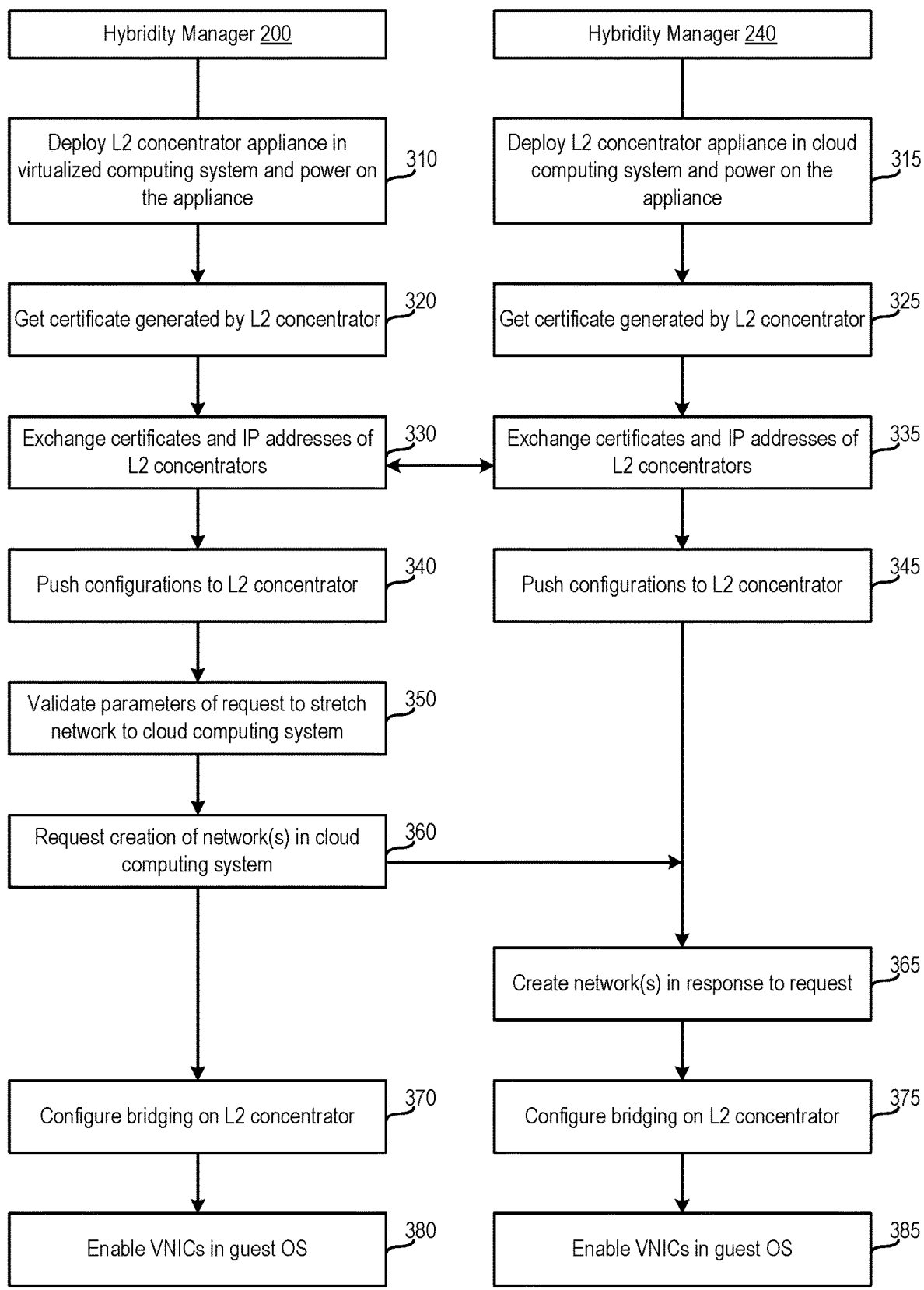
FIG. 3 illustrates a method of creating a stretched network, according to an embodiment.

FIG. 3 illustrates a method 300 of creating an L2 extension network in a hybrid cloud computing system, according to an embodiment. In one embodiment, method 300 may employ the hybrid task framework described above to pass jobs between hybridity manager 200 and hybridity manager 240 and execute those jobs for performing one or more of the steps of method 300.

As shown, method 300 begins at step 310, where hybridity manager 200 deploys L2 concentrator appliance 125 in virtualized computing system 102 and powers on the deployed appliance 125. In one embodiment, L2 concentrator appliance 125 may include a GRE L2 concentrator application therein. As described, one or more (e.g., 8) VNICs $223_i$ of L2 concentrator appliance 125 may be uplink interfaces connected to an uplink network (e.g., an uplink port group) and have distinct IP addresses from, e.g., a user-provided range or list of IP address. Another VNIC 224 of L2 concentrator appliance 125 may be connected to a management network to communicate with hybridity manager 200. Yet another VNIC 222 may be configured as a bridge VNIC that is not initially connected to any port, or connected to a "none" port.

At step 315, hybridity manager 240 deploys a mirror L2 concentrator appliance 185 in cloud computing system 150 and powers on the deployed appliance 185. Similar to L2 concentrator appliance 125, L2 concentrator appliance 185 may include one or more VNICs 263, connected to external network(s), a VNIC 264 connected to a management network for communicating with hybridity manager 240, and a bridge VNIC 262 that is initially not connected to any port or connected to a "none" port. If there are multiple external networks (e.g., multiple Direct Connect networks), then an equal number of VNICs $263_i$ may be connected to each of the external networks in one embodiment. Further, the number of VNICs of L2 concentrator appliance 185 that are connected to the uplink network in virtual computing system 102 may either be the same as, or different from, the number of VNICs of L2 concentrator appliance 125 that are connected to external networks. That is, there may generally be a mesh n: (n*m), where n is the number of uplinks on the virtual computing system 102 side and m is the number/types of external networks on the cloud computing system 150 side.

At steps 320 and 325, hybridity managers 200 and 240 receive certificates from, and establish secure communications sessions with, L2 concentrators 125 and 185, respectively. In one embodiment, after L2 concentrators 125 and 185 are powered on, L2 concentrators 125 and 185 obtain digital certificates (e.g., from a certificate authority) for establishing encrypted communications links and send such certificates to hybridity managers 200 and 240, respectively. For example, certificates may be generated and used to establish Secure Sockets Layer (SSL) sessions between L2 concentrators 125 and 185 and hybridity managers 200 and 240, respectively.

At steps 330 and 335, hybridity managers 200 and 240 exchange certificates for configuring secure tunnels between L2 concentrators 125 and 185 and the IP addresses of L2 concentrators 125 and 185. As described, the secure tunnels may be IPsec tunnels in one embodiment, and, in such a case, certificates may be exchanged to enable Internet Key Exchange (IKE) handshakes for establishing the IPsec tunnels. The certificates themselves may first be obtained by hybridity managers 200 and 240 from, e.g., a certificate authority. Although described herein primarily with respect to certificates, it should be understood that, in alternative embodiments, secure communication tunnels may be established in other ways. For example, IPsec authentication can use pre-shared keys in lieu of digital certificates. It should be understood that hybridity managers 200 and 240 may wait for the certificate exchange at steps 330 and 335 to finish before proceeding further, i.e., at this point the parallel workflows on hybridity managers 200 and 240 may be synchronized. This is because the exchanged certificates are required to create the secure tunnels between L2 concentrators 125 and 185.

At step 340 and 345, hybridity managers 200 and 240 push configurations for establishing secure tunnels to L2 concentrator 125 and L2 concentrator 185, respectively. In one embodiment, the pushed configurations may include details of the local (self) and remote L2 concentrator peer IP addresses, which may be derived from, e.g., an internal IP address pool, as well as number of available WAN uplinks (e.g., the secure tunnels may be configured to make use of all of the available WAN links) and implicit routing. Secure tunnels (e.g., IPsec tunnels) are then created by L2 concentrators 125 185 using the configurations pushed to them at steps 340 and 345.

At step 350, hybridity manager 200 validates parameters of a request to stretch a network to cloud computing system 150. Such parameters may be validated to ensure, e.g., that network(s) specified by a user actually exist in the cloud computing system 150 for the stretched network to attach to. For example, a request to stretch a network may specify a network in cloud computing system 150 with a given gateway and subnet mask, and hybridity management 200 may (e.g., in conjunction with hybridity manager 240) determine whether such a network exists.

At step 360, hybridity manager 200 makes a remote call to request that hybridity manager 240 create network(s) in cloud computing system 150 to which an existing network in virtual computing system 102 may be bridged to create a stretched network. This assumes that, at step 350, it is determined that no such network(s) exist in cloud computing system 150. In turn, hybridity manager 240 creates the network(s) in cloud computing system 150 at step 365. The network(s) that are created may include, e.g., a network that is optimized such that traffic flows between VMs in cloud computing system 150 are routed within cloud computing system 150 without being sent back to virtualized computing system 102, or a combination of such an optimized network and an unoptimized network on which traffic flows may trombone back to a default gateway in virtualized computing system 102, which are described in detail in the patent applications entitled "Stateful Connection Optimization Over Stretched Networks Using Specific Prefix Routes" (Attorney Docket No. D221.01), "Stateful Connection Optimization Over Stretched Networks Using Packet Introspection" (D221.02), and "Stateful Connection Optimization Over Stretched Networks with Temporary Tromboning (D221.03).

At steps 370 and 375, hybridity managers 200 and 240 configure bridging on L2 concentrators 125 and 185, respectively. In one embodiment, the configuring performed by hybridity manager 200 includes reserving bridge VNIC 222 of L2 concentrator 125 and connecting bridge VNIC 222 to network 230 (e.g., by connecting VNIC 222 to the corresponding port group) being stretched. Further, hybridity manager 200 configures virtual switch port 212 to which bridge VNIC 222 is connected as a sink port. As a result, the virtual switch redirects packets with non-local destinations to sink port 212, and L2 concentrator 125 is further configured to bridge so that packets received via sink port 212 are securely sent, via VNICs $223_i$, to L2 concentrator 185 connected to network 270 connected to uplink networks and over the IPsec tunnel between L2 concentrators 125 and 185, to the L2 concentrator 185 connected to network 270. That is, the sink port absorbs traffic with non-local destinations, and then L2 concentrator 125 moves along such traffic based on its destination to one of the networks on the system (bridges or uplinks). It should be understood that virtual switches learn local IP addresses, and virtual switch 211 may thus identify non-local destinations as those IP addresses that have not been learned as local IP addresses, and redirect packets with such non-local destinations to sink port 212 corresponding to a route optimized and an unoptimized network Hybridity manager 240 in cloud computing system 150 may perform similar steps to configure bridging on L2 concentrator 185, including reserving a VNIC 262 corresponding to VNIC 222 reserved in virtualized computing system 102, connecting VNIC 262 to a network (e.g., a virtual wire) backing a cloud network 270; configuring the virtual switch port to which VNIC 262 is connected as a sink port to which traffic with non-local destinations is redirected, and configuring L2 concentrator 185 to establish a bridge between the WAN and local network links, namely the GRE tunnels and VNIC 222 IPsec. In one embodiment, the WAN link may be bridged to one local network link in the case of a network that has been optimized to eliminate tromboning, as described above. Alternatively, the WAN link may be bridged to two local network links corresponding to a route optimized and an unoptimized network. That is, the stretched network that is created includes one network in virtual computing system 102 and either one (a route optimized) or two (a route optimized and an unoptimized) networks in cloud computing system 150.

At steps 380 and 385, hybridity managers 200 and 240 enable VNICs in the guest OSes of L2 concentrators 125 and 185, respectively. That is, hybridity manager 200 and 400 set the in-guest interface state which is controlled for traffic engineering purposes within L2 concentrators 125 and 185. It should be understood that this is different from connecting a VNIC to a port group as described above, which permits the hypervisor to allow L2 concentrator 125 or 185 to connect to a network (physically) when the L2 concentrator 125 or 185 wants to switch a packet/bring the interface into an up state.

CPU Flow Affinity for High Throughput Layer 2 Extension Networks

Figure 4:
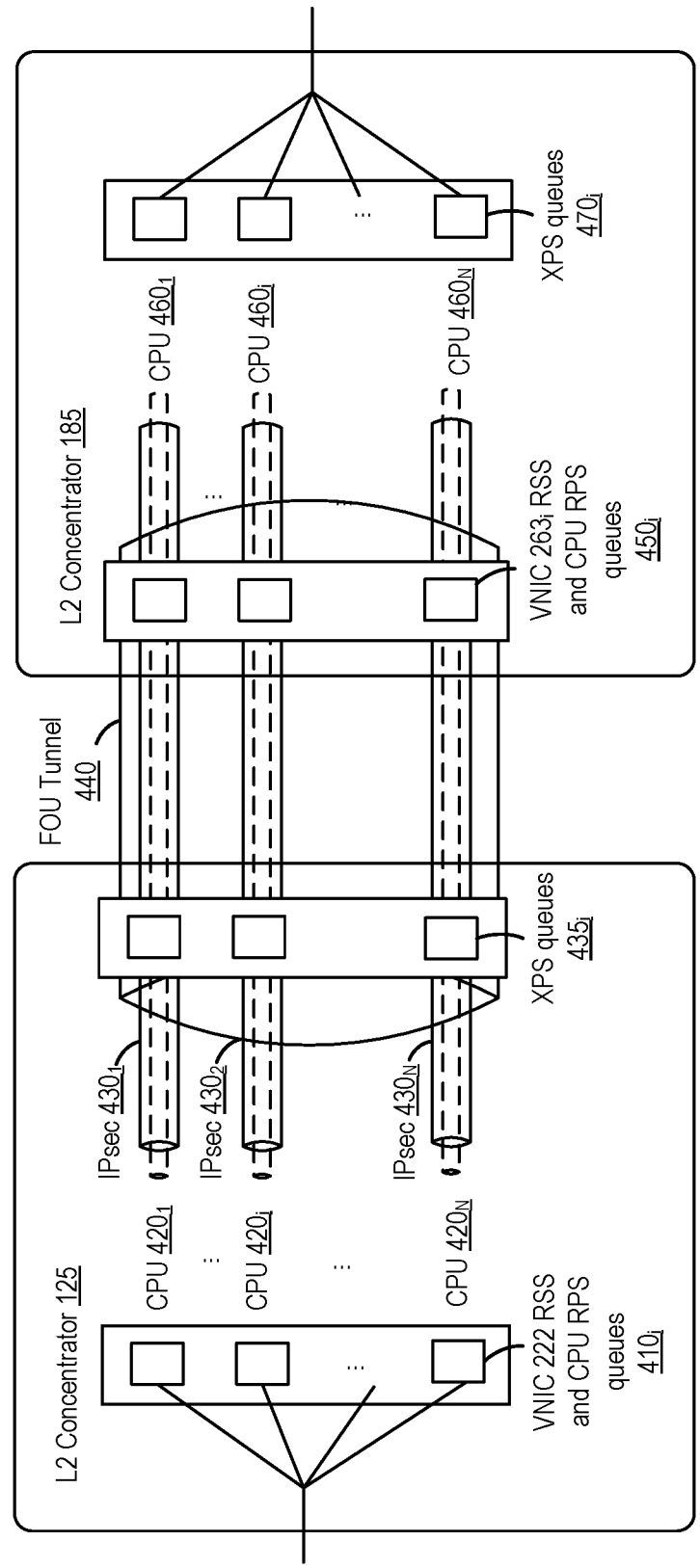
FIG. 4 illustrates an approach for increasing throughput in a stretched network, according to an embodiment.

FIG. 4 illustrates an approach for increasing throughput in a stretched network, according to an embodiment. As shown, network traffic between L2 concentrator 125 and L2 concentrator 185, which are over L3, are encrypted and transmitted via IPsec tunnels $430_i$. It should be understood that, when a network such as a VLAN is stretched across a WAN such as the Internet (or a L2 VPN is used), L2 traffic needs to be transported over L3. As described, such traffic is secured by encryption using IPsec so that even if the traffic is intercepted, it cannot be understood. Some operating systems such as Linux® have built-in IPsec support, with the encryption being performed by crypto modules or off-loaded to CPUs or cores thereof. However, such IPsec tunnels can have limited throughput. For example, experience has shown that an IPsec tunnel using data path forwarding provided by the Linux® kernel and Advanced Encryption Standard Instructions (AES-NI) support built into Intel® CPUs has a maximum throughput of about 1 Gbps due to the encryption overhead.

One embodiment pins multiple Internet Protocol Security (IPsec) tunnels to respective CPUs or cores, which each process traffic flows for one of the IPsec tunnels. Illustratively, L2 concentrator 125 offloads IPsec tunnels $430_i$ to respective CPU or core $420_i$ and takes advantage of crypto (e.g., AES-NI) support provided by those CPUs or cores $420_i$. It should be understood that CPUs or cores $420_i$ may be either virtual or physical CPUs or cores. In one embodiment, L2 concentrator 125 may have a number (e.g., 8) of virtual CPUs and use some (e.g., 5) of those virtual CPUs for network traffic processing and other virtual CPUs for other purposes, such as software interrupts and for a management plane. Although described herein primarily with respect to L2 concentrator 125 in virtualized computing system 102 sending network traffic to L2 concentrator 185 in cloud computing system, it should be understood that similar processing of network traffic may be performed by L2 concentrator 185 in cloud computing system 150 to send traffic to L2 concentrator 125, or by other types of virtual appliances or even physical computers. As described, multiple IPsec tunnels are employed, each with affinity to a specific CPU or core $420_i$, to scale out throughput. Experience has shown that such parallelism using 5 CPUs can achieve a throughput of approximately 3.5 Gbps, with a 4.5 Gbps theoretical limit.

As shown, L2 concentrator 125 first splits traffic flows based on hashes of a number of fields (also referred to herein as a "tuple") of each packet received via VNIC 222. Any feasible fields may be used in such hashing, and different fields may generally be used for different protocols, such as source and destination IP addresses, or source and destination IP addresses and port number. As described, VNIC 222 is connected to a local network 230 in virtualized computing system, and L2 concentrator 125 may receive packets from other VMs on network 230 that L2 concentrator 125 encapsulates in a GRE header, encrypts and encapsulates via IPsec, and then encapsulates in a FOU header for transmission over a WAN (e.g., the Internet) to L2 concentrator 185 in cloud computing system 150. FOU is an IP-in-IP or GRE tunnel with user datagram protocol (UDP) header, and FOU tunnels provide bundling and abstraction of IPsec tunnels so that only one public IP address is required for the FOU tunnel on each side and the IPsec tunnels can use private IP address spaces. Although FOU tunnels are used herein as a reference example, it should be understood that other IP tunnels may be used in lieu of FOU tunnels in other embodiments.

In one embodiment, when L2 concentrator 125 receives packets from other VMs via VNIC 222, L2 concentrator 125 hashes tuples of those packets and places the packets in queues associated with respective CPUs or cores based on the hash values. Illustratively, VNIC 222 of L2 concentrator 125 may implement receive-side scaling (RSS) that distributes received network traffic across receive queues based on a hash function so that such traffic can be processed by multiple CPUs or cores. In addition, the guest OS (e.g., Linux®) running in L2 concentrator 125 may provide receive packet steering (RPS), which is a software-based implementation of receive-side scaling (RSS) in which CPU(s) (rather than NIC(s)) distribute received traffic across receive queues, and RPS may also permits traffic flows (packets coming in on queues) to be re-queue to different CPUs. In one embodiment, L2 concentrator 125 may leverage RPS provided by a guest OS such as the Linux® kernel to perform the hashing of the packet tuples that RPS then places in RPS queues $410_i$.

As shown, VNIC 222 RSS and CPU RPS queues $410_i$ are associated with respective CPUs or cores $420_i$. It should be understood that CPUs typically pick receive queues, such as RSS queues, to process after packets are split across those queues. As a result, there would be no correspondence between CPUs and receive queues. One embodiment overrides this typical behavior by configuring the guest OS (e.g., Linux®) in L2 concentrator 125 to map particular queue numbers to CPUs or cores $410_i$, and setting the number of receive queues equal to the number of transmit queues (e.g., XPS queues $435_i$). Further, different chainings and IP tables may be used to ensure that each of the CPUs or cores $420_i$ processes packets for a respective IPsec tunnel. Such configurations may be pushed to L2 concentrator 125 (and L2 concentrator 185) by hybrid cloud manager 132 (and hybridity director 174), which as described above deploys and manages L2 concentrator 125. As a result, each of the IPsec tunnels has affinity to a specific CPU or core $420_i$.

Illustratively, CPU or core $420_1$ receives packets from a particular receive queue $410_i$ and processes those packets by encapsulating the packets in a GRE header, performing IPsec encryption and adding IPsec headers for IPsec tunnel $430_1$, and encapsulating the IPsec traffic with a FOU header of FOU tunnel 440. CPU or core $420_1$ then places those packets in the corresponding transmit queue $415_1$ for transmission by VNIC(s) $223_i$ of L2 concentrator appliance 125. It should be understood that the mapping of each of CPUs or cores $420_i$ to a respective transmit queue prevents traffic from all going out on the same interface. Further, traffic flows are isolated and processed by one CPU or core from receipt to transmission, which can prevent locking that reduces performance.

On the cloud computing system 150 side, L2 concentrator 185 also uses RSS and RPS to process received packets and distributes those packets across queues $450_i$. However, as the received packets are encapsulated using FOU, the packets may all have the same source and destination IP address in their outer headers and be placed based on RSS/RPS hashing into the same queue, which can create an undesirable bottleneck. One embodiment provides an enhancement to RPS that looks deeper in received packets at internal IP addresses rather than just IP addresses in the outer header. In one embodiment, L2 concentrator 185 determines whether a received packet is a FOU packet and, if such is the case, L2 concentrator 185 looks deeper at an IPsec outer IP address, which is used to hash and place the FOU packet in a receive queue associated with a CPU that removes the FOU header, decrypts and decapsulates the IPsec packet, and removes the GRE header. Doing so distributes FOU packets would otherwise hash to the same queue across different queues, thereby providing performance parallelism. In a particular embodiment, the hash on the IPsec outer IP address may include computing the outer IP address modulo a number of available CPUs or cores. After CPUs or cores $460_i$ process packets, the packets are sent to respective transmit queues $470_i$ for transmission over a cloud-side network to which L2 concentrator 185 is connected.

Figure 5:
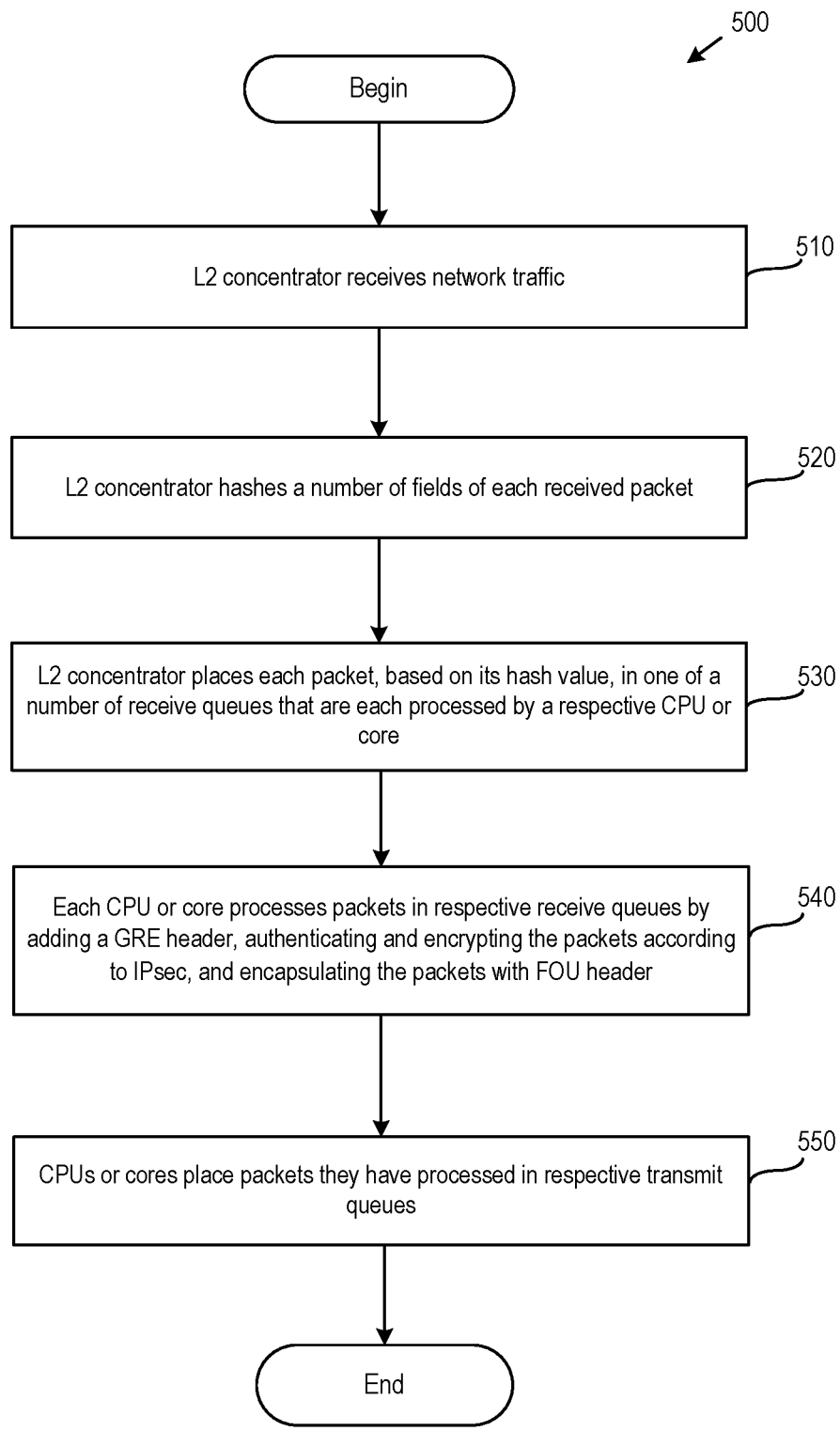
FIG. 5 illustrates a method of processing packets for transmission over a wide area network, according to an embodiment.

FIG. 5 illustrates a method 500 of processing packets for transmission in a stretched network, according to an embodiment. As shown, method 500 begins at step 510, where L2 concentrator 125 receives network traffic. In one embodiment, the received traffic flows may include packets with non-local destinations that are re-directed to a sink port that VNIC 222 of L2 concentrator 125 is connected to, as described above with respect to FIGS. 2-3.

At step 520, L2 concentrator 125 hashes a number of fields (i.e., a tuple) of each packet it receives. Then at step 530, L2 concentrator 125 places each packet, based on its hash value, in one of a number of receive queues that are each processed by a respective CPU or core $410_i$. In one embodiment, L2 concentrator 125 may leverage receive packet steering (RPS), such as that provided by a guest OS (e.g., Linux®), to perform the hashing of packet tuples at step 520 and the placement of the packets in receive queues at step 530. Further, the guest OS may be configured to map particular queue numbers to CPUs or cores $410_i$. As a result, each CPU or core $410_i$ will process packets in one of the receive queues.

At step 540, each CPU or core $420_i$ processes the packets in the respective receive queues by adding an L2 network's (e.g., the L2 VPN's or VLAN's) generic routing encapsulation (GRE) header, authenticating and encrypting/encapsulating the packets according to IPsec, and then encapsulating the packets with a FOU tunnel's UDP header. By maintaining each traffic flow on the same CPU or core, i.e., the traffic flows have affinity to respective CPUs or cores, IPsec tunnels can be processed in parallel while reducing context switching resulting from different CPUs or cores accessing the same queue.

At step 550, each CPU or core $420_i$ places the packets it has processed in a respective transmit queue. As described, the guest OS may be configured to set the number of receive queues equal to the number of transmit queues and to map particular queue numbers to CPUs or cores $410_i$. As a result, packets may each be processed by one CPU or core from the receipt of packets to the transmission of those packets.

Figure 6:
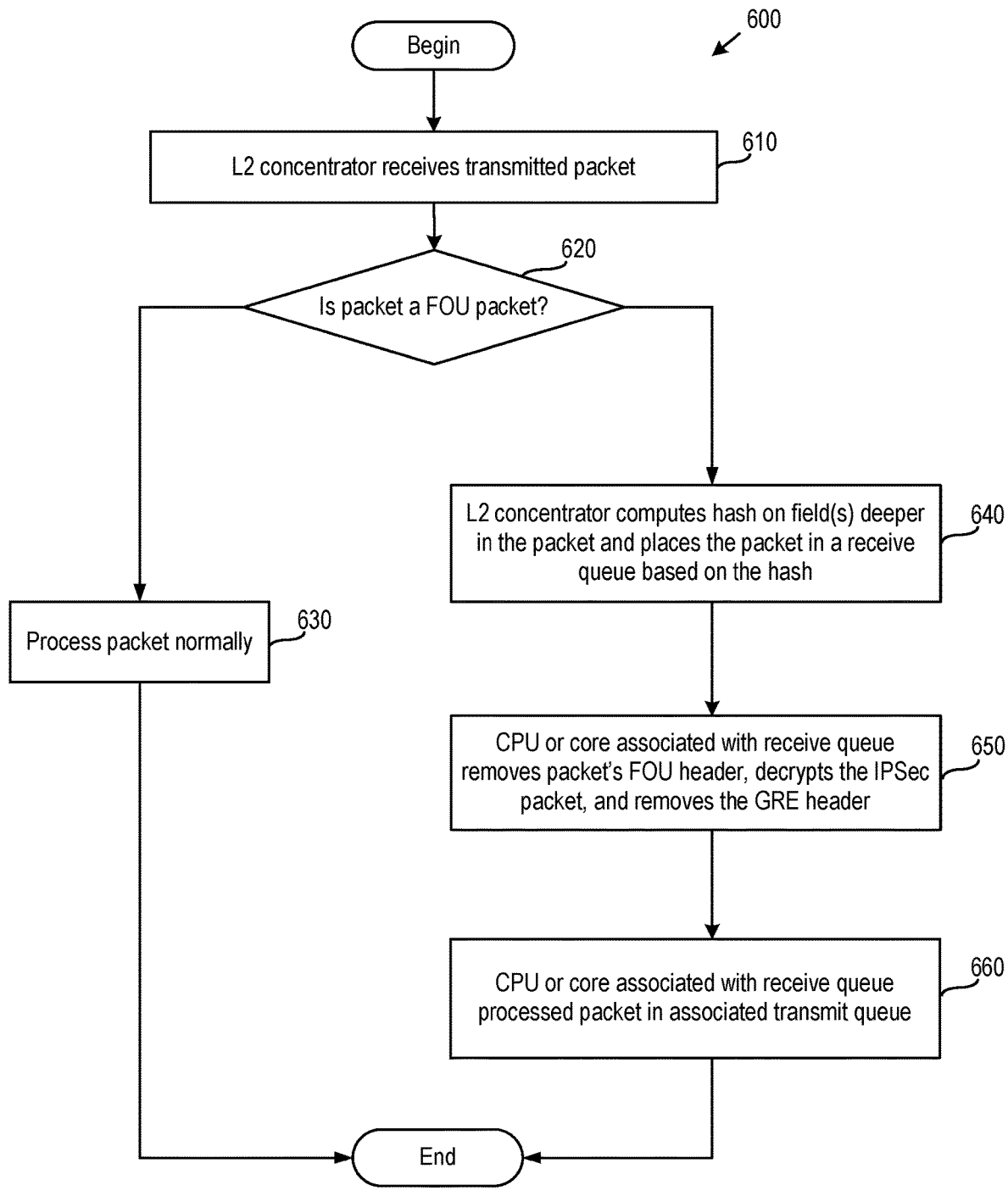
FIG. 6 illustrates a method of processing received packets in a stretched network, according to an embodiment.

FIG. 6 illustrates a method 600 of processing received packets in a stretched network, according to an embodiment. As shown, method 600 begins at step 610, where L2 concentrator 185 receives a packet transmitted by L2 concentrator 125.

At step 620, L2 concentrator 185 inspects the packet and determines whether the packet is a FOU packet. If the packet is a not a FOU packet, L2 concentrator 185 processes the packet normally at step 630 by, e.g., computing a hash based on fields of an outer header and placing the packet in a receive queue based on the computed hash.

On the other hand, if the packet is a FOU packet, then at step 640, L2 concentrator 185 computes a hash on field(s) deeper in the packet and places the packet in a receive queue based on the hash. In one embodiment, a number (e.g., 5) IPsec tunnel packets could be encapsulated by the same FOU tunnel, L2 concentrator 185 looks deeper in the packet to get to the IPsec outer IP, which L2 concentrator 185 uses to select the receive queue. Further, each receive queue is mapped to a different CPU so that received FOU packets are distributed across receive queues, providing performance parallelism. In one embodiment, L2 concentrator 125 may include an enhanced RPS, such as a user-defined RPS, that performs the steps 620-650 of checking for FOU packets, inspecting deeper within such packets, and placing the packets in appropriate receive queues.

Then at step 650, the CPU or core 450$_i$ associated with the receive queue into the FOU packet was placed removes the packet's FOU header, decrypts and decapsulates the IPsec/ESP, and removes the GRE header to get the original L2 frame. The L2 frame is further forwarded through the L2 concentrator 185 bridge.

At step 660, the CPU or core 450$_i$ associated with the receive queue places the processed packet in one of transmit queues 470$_i$.

Although described herein primarily with respect to L2 concentrator appliances, it should be understood that techniques disclosed herein may used with other types of virtual appliances, or even physical computers.

Advantageously, techniques disclosed herein permit L2 extension networks to have higher throughput by leveraging CPU flow affinity, which is unlike traditional IPsec that does not provide affinity to CPUs or cores. In addition, use of multiple IPsec tunnels, each with affinity to a specific CPU or core, permits embodiments disclosed herein to taking advantage of the increasing numbers and speed of CPUs/cores in server systems.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of processing packets for transmission, comprising:
receiving, at a first device coupled to a first network, a packet to be transmitted to a second device coupled to a second network;
determining, at the first device, a first hash value based on at least one or more fields in the packet; and
placing the packet in one of a plurality of receive queues of the first device based on at least the first hash value, wherein first packets placed in a first receive queue of the plurality of receive queues are processed by a first CPU or core of the first device, such that the first CPU or core encrypts the first packets placed in the first receive queue based on an Internet Protocol Security (IPSec) protocol and transmits the first packets to the second device coupled to the second network through a first IPSec tunnel, wherein second packets placed in a second receive queue of the plurality of receive queues are processed by a second CPU or core of the first device, such that the second CPU or core encrypts the second packets placed in the second receive queue based on the IPSec protocol and transmits the second packets to the second device coupled to the second network through a second IPSec tunnel different than the first IPSec tunnel.

2. The method of claim 1, wherein the first CPU or core further places the first packets processed by the first CPU or core in a first transmit queue associated with the first CPU or core to transmit the first packets to the second device coupled to the second network through the first IPSec tunnel, and the second CPU or core further places the second packets processed by the second CPU or core in a second transmit queue associated with the second CPU or core to transmit the second packets to the second device coupled to the second network through the second IPSec tunnel.

3. The method of claim 1, wherein the first CPU or core encrypts each of the first packets placed in the first receive queue by:
encapsulating the packet in a generic routing encapsulation (GRE) header;
authenticating, encrypting, and encapsulating the packet according to the IPsec protocol; and
encapsulating the packet with a Foo over UDP (FOU) tunnel User Datagram (UDP) header.

4. The method of claim 3, wherein the packet encapsulated with the FOU UDP header is processed upon receipt by the second device which performs steps including:

subsequent to removing the FOU UDP header from the packet, decrypting the IPsec packet and removing an associated header, and removing the GRE header from the packet;
determining a second hash value based on at least one or more fields in the packet, and
placing the packet in one of a plurality of second receive queues based on at least the second hash value.

5. The method of claim 1, wherein the packet is received from the first network in a first computing system which is bridged through a wide area network (WAN) to the second network in a second computing system.

6. The method of claim 5, wherein the first computing system is a private virtualized computing system and the second computing system is a cloud computing system.

7. The method of claim 1, wherein the first device is a virtual appliance.

8. The method of claim 7, wherein the virtual appliance includes a layer 2 (L2) concentrator application.

9. A non-transitory computer-readable medium comprising instructions executable by a first device, the first device having one or more physical central processing units (CPUs), wherein the instructions, when executed, cause the first device to perform operations for processing packets for transmission, comprising:
receiving, at the first device coupled to a first network, a packet to be transmitted to a second device coupled to a second network;
determining, at the first device, a first hash value based on at least one or more fields in the packet; and
placing the packet in one of a plurality of receive queues of the first device based on at least the first hash value, wherein first packets placed in a first receive queue of the plurality of receive queues are processed by a first CPU or core of the first device, such that the first CPU or core encrypts the first packets placed in the first receive queue based on an Internet Protocol Security (IPSec) protocol and transmits the first packets to the second device coupled to the second network through a first IPSec tunnel, wherein second packets placed in a second receive queue of the plurality of receive queues are processed by a second CPU or core of the first device, such that the second CPU or core encrypts the second packets placed in the second receive queue based on the IPSec protocol and transmits the second packets to the second device coupled to the second network through a second IPSec tunnel different than the first IPSec tunnel.

10. The computer-readable medium of claim 9, wherein the first CPU or core further places the first packets processed by the first CPU or core in a first transmit queue associated with the first CPU or core to transmit the first packets to the second device coupled to the second network through the first IPSec tunnel, and the second CPU or core further places the second packets processed by the second CPU or core in a second transmit queue associated with the second CPU or core to transmit the second packets to the second device coupled to the second network through the second IPSec tunnel.

11. The computer-readable medium of claim 9, wherein the first CPU or core encrypts each of the first packets placed in the first receive queue by:
encapsulating the packet in a generic routing encapsulation (GRE) header;
authenticating, encrypting, and encapsulating the packet according to the IPsec protocol; and encapsulating the packet with a Foo over UDP (FOU) tunnel User Datagram (UDP) header.

12. The computer-readable medium of claim 11, wherein the packet encapsulated with the FOU UDP header is processed upon receipt by the second device which performs steps including:
    subsequent to removing the FOU UDP header from the packet, decrypting the IPsec packet and removing an associated header, and removing the GRE header from the packet;
    determining a second hash value based on at least one or more fields in the packet; and
    placing the packet in one of a plurality of second receive queues based on at least the second hash value.

13. The computer-readable medium of claim 9, wherein the packet is received from the first network in a first computing system which is bridged through a wide area network (WAN) to the second network in a second computing system.

14. The computer-readable medium of claim 13, wherein the first computing system is a private virtualized computing system and the second computing system is a cloud computing system.

15. The computer-readable medium of claim 9, wherein the first device is a virtual appliance.

16. The computer-readable medium of claim 15, wherein the virtual appliance includes a layer 2 (L2) concentrator application.

17. A system, comprising:
    a processor; and
    a memory, wherein the memory includes a program configured to perform operations for processing packets for transmission, comprising:
        receiving, at a first device coupled to a first network, a packet to be transmitted to a second device coupled to a second network;
        determining, at the first device, a first hash value based on at least one or more fields in the packet; and
        placing the packet in one of a plurality of first receive queues of the first device based on at least the first hash value, wherein first packets placed in a first receive queue of the plurality of receive queues are processed by a first CPU or core of the first device, such that the first CPU or core encrypts the first packets placed in the first receive queue based on an Internet Protocol Security (IPSec) protocol and transmits the first packets to the second device coupled to the second network through a first IPSec tunnel, wherein second packets placed in a second receive queue of the plurality of receive queues are processed by a second CPU or core of the first device, such that the second CPU or core encrypts the second packets placed in the second receive queue based on the IPSec protocol and transmits the second packets to the second device coupled to the second network through a second IPSec tunnel different than the first IPSec tunnel.

18. The system of claim 17, wherein the first CPU or core further places the first packets processed by the first CPU or core in a first transmit queue associated with the first CPU or core to transmit the first packets to the second device coupled to the second network through the first IPSec tunnel, and the second CPU or core further places the second packets processed by the second CPU or core in a second transmit queue associated with the second CPU or core to transmit the second packets to the second device coupled to the second network through the second IPSec tunnel.

19. The system of claim 17, wherein the first CPU or core encrypts each of the first packets placed in the first receive queue by:
    encapsulating the packet in a generic routing encapsulation (GRE) header;
    authenticating, encrypting, and encapsulating the packet according to the IPsec protocol; and
    encapsulating the packet with a Foo over UDP (FOU) tunnel User Datagram (UDP) header.

20. The system of claim 19, wherein the packet encapsulated with the FOU UDP header is processed upon receipt by the second device which performs steps including:
    subsequent to removing the FOU UDP header from the packet, decrypting the IPsec packet and removing an associated header, and removing the GRE header from the packet;
    determining a second hash value based on at least one or more fields in the packet; and
    placing the packet in one of a plurality of second receive queues based on at least the second hash value.

* * * * *